(12) United States Patent
Sciarra et al.

(10) Patent No.: US 9,177,097 B2
(45) Date of Patent: Nov. 3, 2015

(54) AIRCRAFT WIRING LAYOUT VERIFICATION SYSTEM

(75) Inventors: Michael Patrick Sciarra, Seattle, WA (US); Alfredo Zamora Campos, Snohomish, WA (US); Brent Louis Hadley, Kent, WA (US); Patrick Eames, Newcastle, WA (US); Joshua M. Taylor, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 13/466,701

(22) Filed: May 8, 2012

(65) Prior Publication Data
US 2013/0304426 A1 Nov. 14, 2013

(51) Int. Cl.
*G06F 17/50* (2006.01)

(52) U.S. Cl.
CPC .......... *G06F 17/509* (2013.01); *G06F 17/5095* (2013.01); *G06F 2217/34* (2013.01); *G06F 2217/36* (2013.01)

(58) Field of Classification Search
CPC .. G06F 17/50; G06F 17/5004; G06F 17/5086
USPC .......................................................... 703/1
See application file for complete search history.

(56) References Cited

U.S. PATENT DOCUMENTS

| | | | |
|---|---|---|---|
| 6,842,173 B2 * | 1/2005 | Sakakura et al. ............. | 345/419 |
| 6,867,768 B2 * | 3/2005 | Sakakura et al. ............. | 345/419 |
| 7,082,590 B2 * | 7/2006 | Kragh et al. ................. | 716/129 |
| 7,107,197 B1 * | 9/2006 | Shropshire ...................... | 703/13 |
| 7,154,625 B2 | 12/2006 | ElGazzar et al. | |
| 7,725,846 B2 * | 5/2010 | Yvon et al. ................... | 716/103 |
| 7,958,467 B2 | 6/2011 | Bowen | |
| 8,005,650 B2 * | 8/2011 | Flores et al. ...................... | 703/1 |
| 8,131,392 B2 * | 3/2012 | Kersavage et al. .............. | 700/97 |
| 8,274,511 B2 * | 9/2012 | Sato .............................. | 345/420 |
| 2009/0222121 A1 * | 9/2009 | Flores et al. .................... | 700/98 |
| 2010/0146466 A1 | 6/2010 | Hadley et al. | |
| 2010/0235157 A1 * | 9/2010 | Vedula et al. ................... | 703/13 |

* cited by examiner

*Primary Examiner* — Aniss Chad
(74) *Attorney, Agent, or Firm* — Yee & Associates, P.C.

(57) ABSTRACT

A method and apparatus for verifying routing of a number of signal lines in an aircraft. A number of pathways through a volume is identified in the aircraft for a desired routing of the number of signal lines using a preferred systems layout for the aircraft. A determination is made as to whether a designed routing of the number of signal lines in a design of the aircraft is within the number of pathways through the volume for the desired routing of the number of signal lines. The number of signal lines is identified as having the desired routing in response to a determination that the designed routing is within the number of pathways through the volume.

21 Claims, 14 Drawing Sheets

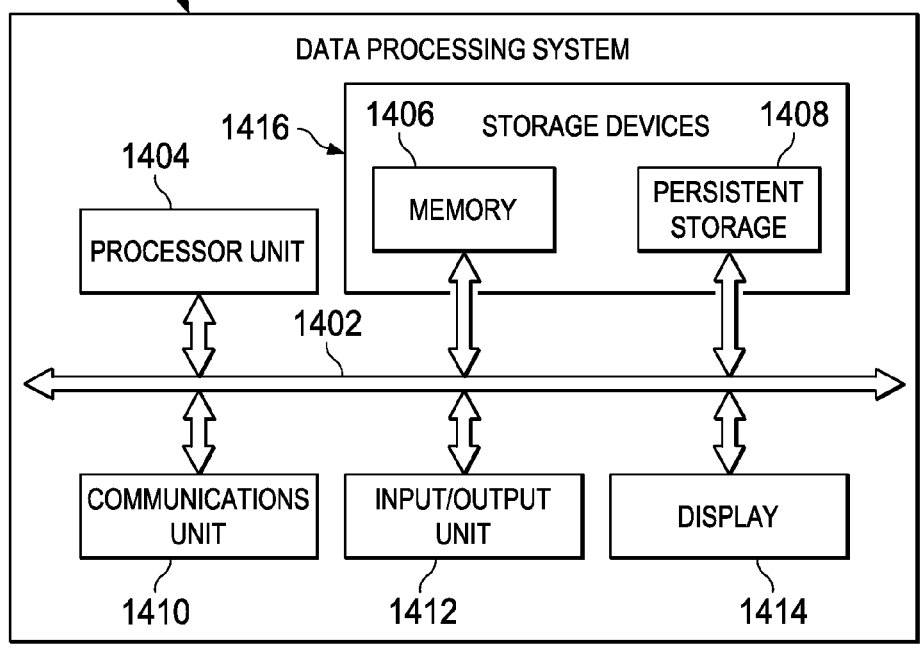
FIG. 14
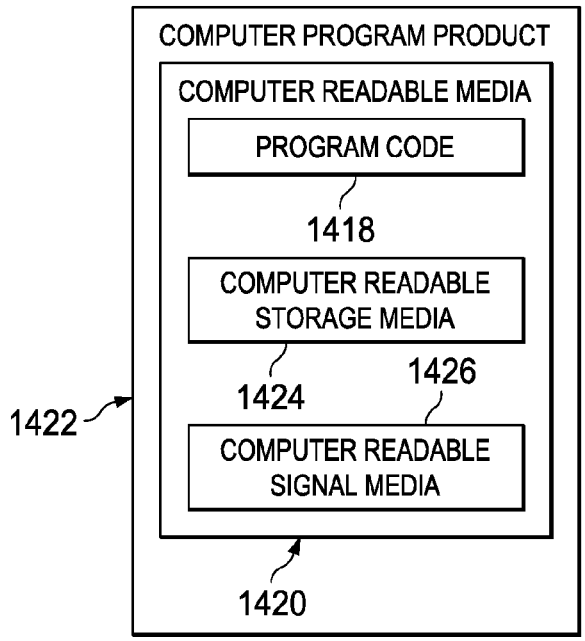

AIRCRAFT WIRING LAYOUT VERIFICATION SYSTEM

BACKGROUND INFORMATION

1. Field

The present disclosure relates generally to aircraft and, in particular, to transport elements in aircraft. Still more particularly, the present disclosure relates to a method and apparatus for verifying that wires in an aircraft provide a desired level of performance.

2. Background

Aircraft have become increasingly more complex over time. More and more components in the aircraft are comprised of electrical devices. These electrical devices may form the avionics in the aircraft. For example, the avionics may include communications systems, navigation systems, sensor monitoring systems, environmental control systems, in-flight entertainment systems, aircraft flight control systems, collision avoidance systems, weather systems, aircraft management systems, and other suitable systems.

These and other systems may form a network within the aircraft. The different systems may be powered by and communicate with each other through transport elements such as wires, optical fibers, wireless signals, and other types of transport elements. For example, wires may run through different portions of the aircraft such as the fuselage, wings, stabilizers, and other portions of the aircraft.

The wires may form a wiring system within the aircraft. With the amount of wires present in an aircraft, selecting locations and redundancy for wiring systems in an aircraft may follow different designs to provide for a desired level of operation of the aircraft. For example, it is desirable that the aircraft be capable of continued safe flight and landing in the event that portions of the wiring system do not operate as desired.

Different undesired events may affect the ability of portions of the wiring system to function as desired. An undesired event may be, for example, an electromagnetic event such as lightning, a bird strike, excessive power flow, and other undesired events. In providing a desired level of operation, the routing of wires through the aircraft may be selected such that different events leave sufficient portions of the wires in the wiring system in a condition to carry power, data, and other types of signals such that different electrical systems may operate as desired in the aircraft during flight.

The number of redundancy in wires, the routing of wires, and other parameters about wires used with electrical systems are regulated through rules from governmental entities. For example, the Federal Aviation Administration provides regulations on requirements for electrical systems and the wiring for those systems. Manufacturers design wiring systems to connect electrical systems that fulfill these requirements.

In fulfilling these requirements, aircraft designs are created to meet the requirements of the regulations. Simulations are run, designs are revised, tests are performed with wiring systems, and other operations are performed in the development of an aircraft.

Further, after an aircraft is developed, customers may select different types of electrical systems. For example, some clients may select different types of in-flight entertainment systems, environmental control systems, and other types of systems. These different systems often result in changes to the wiring system. As a result, the changes are analyzed to verify that the wiring system will meet the requirements of the regulations.

With the numerous systems and large amounts of wiring, identifying desired routing and redundancy in an aircraft to meet regulations may take more time and effort than desired. Currently, the verification of the routing is performed line by line for wires and other lines by a human operator. This process is extremely tedious and time consuming even with the use of computer aided design programs due to the complexity of the systems in aircraft. Therefore, it would be desirable to have a method and apparatus that takes into account at least some of the issues discussed above as well as other possible issues.

SUMMARY

In one illustrative embodiment, a method for verifying routing of a number of signal lines in an aircraft is present. A number of pathways through a volume is identified in the aircraft for a desired routing of the number of signal lines using a preferred systems layout for the aircraft. A determination is made as to whether a designed routing of the number of signal lines in a design of the aircraft is within the number of pathways through the volume for the desired routing of the number of signal lines. The number of signal lines is identified as having the desired routing in the design in response to a determination that the designed routing is within the number of pathways through the volume.

In another illustrative embodiment, a method for verifying routing of a number of transport elements is present. A number of pathways through a volume is identified in a vehicle for a desired routing of the number of transport elements using a preferred systems layout for the vehicle. A determination is made as to whether a designed routing of the number of transport elements in a design of the vehicle is within the number of pathways through the volume for the desired routing of the number of transport elements. The number of transport elements is identified as having the desired routing in the design in response to a determination that the designed routing is within the number of pathways through the volume.

In yet another illustrative embodiment, an apparatus comprises a verifier. The verifier is configured to identify a number of pathways through a volume in an aircraft for a desired routing of a number of signal lines using a preferred systems layout for the aircraft. The verifier is further configured to determine whether a designed routing of the number of signal lines in a design of the aircraft is within the number of pathways through the volume for the desired routing of the number of signal lines. The verifier is further configured to identify the number of signal lines as having the desired routing in the design responsive to a determination that the designed routing is within the number of pathways through the volume.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a data processing system in accordance with an illustrative embodiment;

DETAILED DESCRIPTION

The illustrative embodiments recognize and take into account one or more different considerations. For example, a preferred systems layout for an aircraft may be created such that variations in the placement of systems and the routing of transport elements may be taken into account more easily when changes occur in response to different options, upgrades, or changes to the design of systems in the aircraft. In these illustrative examples, the routing of a transport element may be in three-dimensional space. For example, the path that transport elements take through a platform may be described in three-dimensional space.

The illustrative embodiments recognize and take into account that a preferred systems layout defines a volume in an aircraft. The volume is one in which equipment and transport elements may be placed such that the aircraft may perform as desired. Additionally, the preferred systems layout also may include pathways for transport elements within the volume.

The illustrative embodiments recognize and take into account that a preferred systems layout may be generated for a particular model of an aircraft. The preferred systems layout defines the placement of equipment and transport elements that are used in operating the aircraft in a desired manner. In these illustrative examples, a transport element may be selected from one of a wire, a fluid line, a gas line, a fuel line, a hydraulic fluid line, an optical fiber, a wireless communications link, and other suitable types of transport elements.

The illustrative embodiments recognize and take into account that a volume in a preferred systems layout may include one or more pathways through which wires connected to systems may be routed. When a wiring system is designed, a verification that the wires in the wiring system follow pathways through the volume as set out by the preferred systems layout is performed. For example, a preferred systems layout for the routing of wires may indicate that redundant wires may be routed through different pathways in the volume.

Thus, the illustrative embodiments provide a method and apparatus for verifying the routing of transport elements. In one illustrative embodiment, a method is present for verifying the routing of transport elements in the form of a number of signal lines in an aircraft. As used herein, "a number of" when used with reference to items means one or more items. For example, a number of signal lines is one or more signal lines.

A number of pathways through a volume in an aircraft is identified for a desired routing of the number of signals lines. A determination is made as to whether the routing of the number of signal lines in a design is within the number of pathways through the volume for the desired routing of the number of signal lines. The number of signal lines is identified as having a desired routing in response to a determination that the routing in the design is within the number of pathways through the volume.

Figure 1:
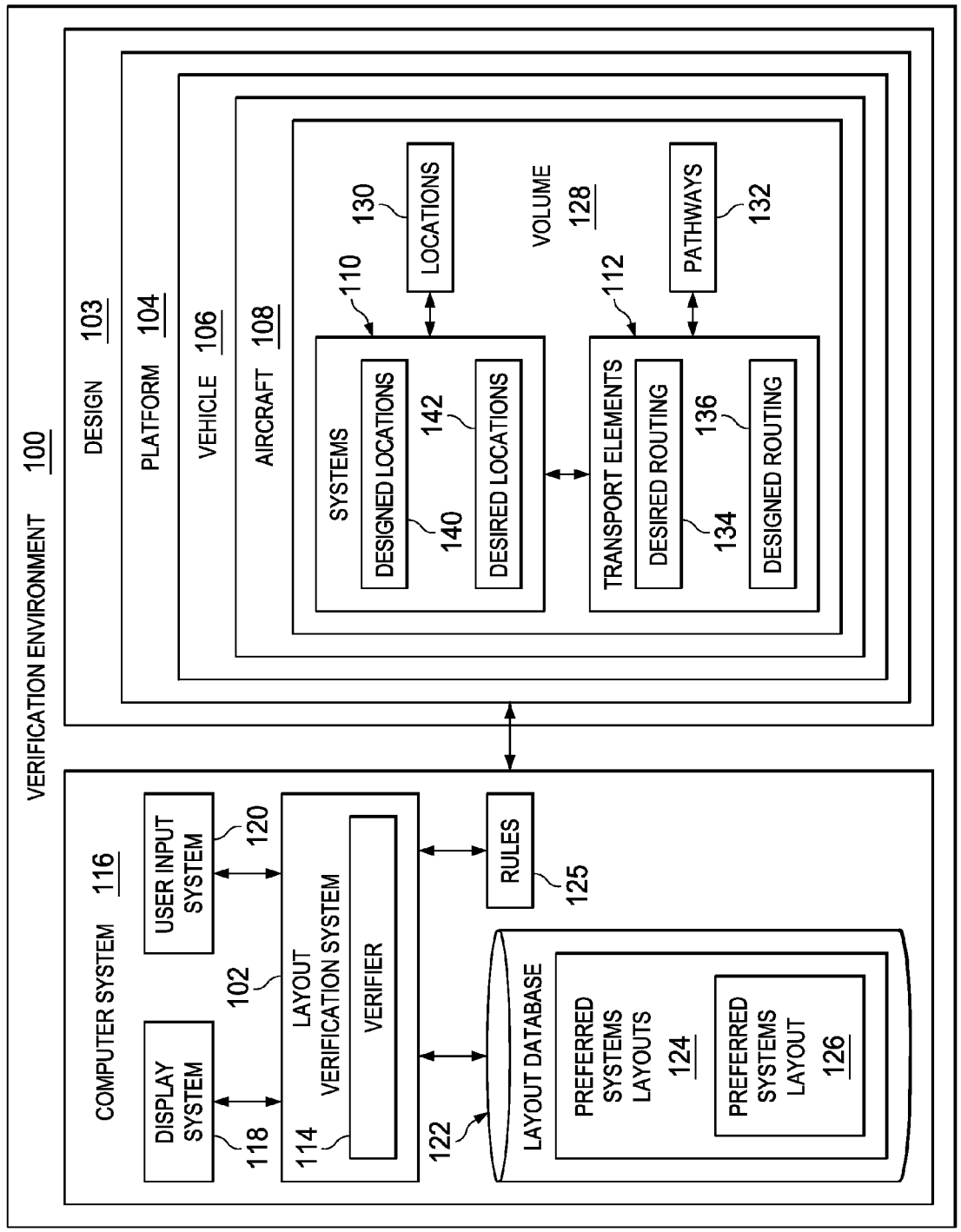
FIG. 1 is an illustration of a block diagram of a verification environment in accordance with an illustrative embodiment.

With reference now to the figures and, in particular, with reference to FIG. 1, an illustration of a block diagram of a verification environment is depicted in accordance with an illustrative embodiment. Verification environment 100 includes layout verification system 102 and design 103 for platform 104. Platform 104 takes the form of vehicle 106 in this illustrative example. In particular, vehicle 106 may be aircraft 108.

As depicted, layout verification system 102 may be used to determine whether systems 110 and transport elements 112 in design 103 for aircraft 108, are configured as desired for a desired operation of aircraft 108.

As depicted, design 103 may take various forms. Design 103 is data that may be used to perform simulations, analysis, and manufacture aircraft 108. Design 103 may be, for example, a computer aided design model and some other suitable type of model or design. Design 103 may be for all or a portion of aircraft 108. For example, in one implementation, design 103 may be for some of systems 110 and transport elements 112. In another example, design 103 may include all of systems 110 and transport elements 112 as well as other parts of aircraft 108, such as the fuselage, wings, and other components.

In these illustrative examples, systems 110 and transport elements 112 may be a portion of all of the systems and transport systems in design 103 for aircraft 108. Systems 110 and transport elements 112 are the components needed for the desired operation of aircraft 108. Other systems and transport elements may not be necessary for the desired operation of aircraft 108.

For example, the desired operation may be to operate with continued safe flight during landing of aircraft 108 manufactured using design 103 in response to an undesired event. In other illustrative examples, the desired operation may be that aircraft 108 operates with a desired level of comfort for passengers. These and other types of desired operations may be checked through layout verification system 102.

In this illustrative example, this determination and other types of determinations with respect to the configuration of systems 110 and transport elements 112 in design 103 may be made by verifier 114 within layout verification system 102. Verifier 114 is implemented in hardware, software, or a combination of the two. When software is used, the operations performed by verifier 114 may be implemented in program code to be run on a processor unit. When hardware is employed, the hardware may include circuits that operate to perform the operations for verifier 114.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

In this illustrative example, verifier 114 may be implemented in computer system 116. Computer system 116 is comprised of one or more computers. When more than one computer is present, these computers may be in communication with each other through a communications media such as a network.

In this illustrative example, layout verification system 102 also includes display system 118 and user input system 120. Display system 118 is hardware and may comprise one or more display devices. User input system 120 also is hardware and may comprise one or more user input devices. These user input devices may be, for example, without limitation, a mouse, a keyboard, a touch screen, and other suitable types of user input devices.

Verifier 114 uses layout database 122 to determine whether systems 110 and transport elements 112 are laid out in design 103 for aircraft 108 to provide a desired level of operation for aircraft 108. Layout database 122 includes preferred systems layouts 124.

In these illustrative examples, preferred systems layouts 124 are based on rules 125. In other words, preferred systems layouts 124 are designed to meet rules 125. Rules 125 may define requirements for desired operation of aircraft 108. Rules 125, however, typically do not define placement of systems 110 and routing of transport elements 112 in aircraft 108. For example, rules 125 may define what is required from systems 110, transport elements 112, or both to provide desired operation of aircraft 108 in response to an undesired event. Further, rules 125 also may define requirements for systems 110 and transport elements 112 for other types of desired operation that may not be in response to an undesired event.

Rules 125 may be, for example, without limitation, government regulations, client performance specifications, and other suitable sources for rules 125. For example, regulations from a government entity, such as the Federal Aviation Administration, may define rules for the manner in which systems 110 and transport elements 112 form to meet a desired level of operation such as continued safe flight and landing when certain undesired events occur.

Additionally, rules 125 may include manufacturing rules based on customer preferences. For example, a customer may require some level of redundancy in transport elements 112. This redundancy may be, for example, having transport elements for the same systems pass through different pathways through different volumes in an aircraft. Thus, the regulations may be manufacturer regulations, government regulations, and regulations or rules by other entities.

Preferred systems layouts 124 contain layouts that define configurations for desired operation of aircraft 108. In other words, if systems 110 and transport elements 112 follow preferred systems layout 126 in design 103 for aircraft 108 in preferred systems layouts 124, systems 110, transport elements 112, or both are considered to meet rules 125 for desired operation of aircraft 108.

Preferred systems layouts 124 include layouts for different types of aircraft, vehicles, or platforms depending on the particular implementation. Preferred systems layouts 124 may take various forms. For example, without limitation, preferred systems layouts 124 may be comprised of at least one of a model of the platform, coordinates describing the preferred layout, and other suitable types of information.

In this illustrative example, preferred systems layout 126 defines volume 128 in aircraft 108. Volume 128 is a volume in aircraft 108 and may be contiguous or may have portions that are separated from each other within aircraft 108.

Additionally, preferred systems layout 126 also defines locations 130 and pathways 132 in design 103 for aircraft 108. Locations 130 are locations within volume 128 in design 103 of aircraft 108 in which systems 110 may be located in design 103 as defined by preferred systems layout 126. For example, a system within systems 110 may have more than one location in locations 130. As long as the system is placed in one of those locations in design 103, the system is considered to have a location that meets the requirements set out by rules 125 in these illustrative examples. In other words, locations 130 and pathways 132 are desired locations and pathways for design 103 of aircraft 108. In one example, pathways 132 through volume 128 for desired routing of a number of signal lines in preferred systems layout may be based on a set of regulations.

As depicted, pathways 132 within volume 128 of aircraft 108 are pathways for transport elements 112 in aircraft 108 as defined by preferred systems layout 126. Pathways 132 are pathways for desired routing 134 of transport elements 112 when designing design 103 for aircraft 108. For example, a transport element in transport elements 112 may have one or more pathways in pathways 132. When more than one pathway is present in pathways 132, the transport element may be routed through any of those pathways. As long as the transport element is routed along the path or paths for that transport element in pathways 132 in design 103, the transport element is considered to meet rules 125. In other words, a transport element may be required to be routed through a number of the pathways in pathways 132 designated for that transport element. In some cases, only one pathway may be present for the transport element to meet rules 125, while in other cases, more than one pathway may be present in pathways 132 for the transport element to meet rules 125.

In these illustrative examples, locations 130 in volume 128 for systems 110 and pathways 132 though volume 128 for transport elements 112 may be identified ahead of time for creating design 103 using preferred systems layout 126. Pathways 132 and volume 128 in design 103 of aircraft 108 may be selected to allow for variations in locations 130 for systems 110 and variations in pathways 132 for transport elements 112 based on different options that may be selected for aircraft 108. These variations may be selected using preferred systems layout 126 such that the routing of transport elements 112 based on different options for systems 110 still provides for desired routing 134 in design 103 such that aircraft 108 operates as desired.

In particular, aircraft 108 manufactured using design 103 may operate as desired. In this illustrative example, verifier 114 may be used to verify routing of transport elements 112 in design 103. For example, verifier 114 may determine whether designed routing 136 for transport elements 112 are within pathways 132 for desired routing 134 of transport elements 112 in design 103. Designed routing 136 is the routing selected for transport elements in design 103 of aircraft 108 in these illustrative examples. Designed routing 136 is the location of the transport element in transport elements 112 as the transport element extends through aircraft 108 in design 103.

Desired routing 134 is routing of transport elements 112 that falls within pathways 132 in aircraft 108 in design 103 as defined by preferred systems layout 126. In these illustrative examples, if designed routing 136 of transport elements 112 is within pathways 132 through volume 128, transport elements 112 are identified as having desired routing 134.

A similar comparison may be made for systems 110. For example, a determination may be made as to whether designed locations 140 are in locations 130 for systems 110 for desired locations 142. As described above, preferred systems layouts 124 are generated such that systems 110, transport elements 112, or a combination of the two falling within preferred systems layouts 124 are considered to meet rules 125.

Additionally, layout verification system 102 may make the design of aircraft 108 easier and quicker to perform. For example, pathways 132 in aircraft 108 through volume 128 as defined by preferred systems layout 126 may be followed by a designer of aircraft 108 in designing systems 110 and transport elements 112 in design 103 of aircraft 108. The designer may select pathways that follow pathways 132 for different transport elements 112 for different options for systems 110 that may be included in design 103 of aircraft 108 to form designed routing 136. Verifier 114 may then verify that at least one of designed routing 136 of transport elements 112 in design 103 falls within pathways 132, and designed locations 140 of systems 110 in design 103 are within locations 130 using preferred systems layout 126.

Figure 2:
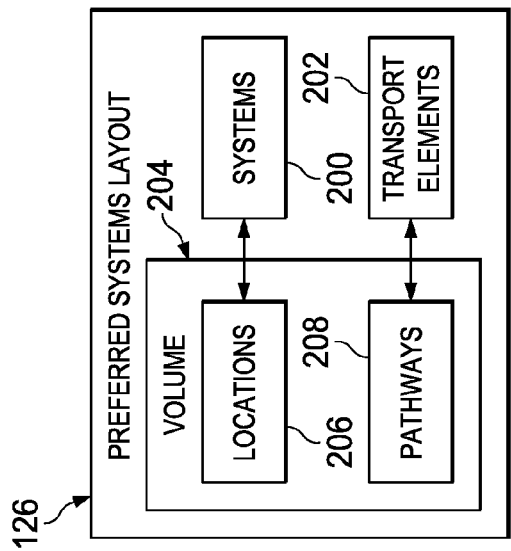
FIG. 2 is an illustration of a block diagram of a preferred systems layout in accordance with an illustrative embodiment.

Turning now to FIG. 2, an illustration of a block diagram of a preferred systems layout is depicted in accordance with an illustrative embodiment. In this illustrative example, an example of one implementation for preferred systems layout 126 is shown. As depicted, systems 200 and transport elements 202 are identified in preferred systems layout 126. These components are ones that are required to meet rules 125 in FIG. 1.

As depicted, preferred systems layout 126 also includes volume 204, locations 206, and pathways 208. Volume 204, locations 206, and pathways 208 may be a model, coordinates, or other suitable forms of information in preferred systems layout 126. As depicted, volume 204 and pathways 208 may be described using aircraft coordinates for aircraft 108 in these illustrative examples. Each system in systems 200 has one or more locations 206. Each transport element in transport elements 202 may have one or more pathways in pathways 208.

In these illustrative examples, preferred systems layout 126 is for a particular model for aircraft 108. Preferred systems layout 126 may be designed to include different options for systems 200 that may be used in aircraft 108.

In these illustrative examples, volume 204 and a number of pathways 208 may be selected such that a number of transport elements 202 are likely to continue to operate as desired.

Figure 3:
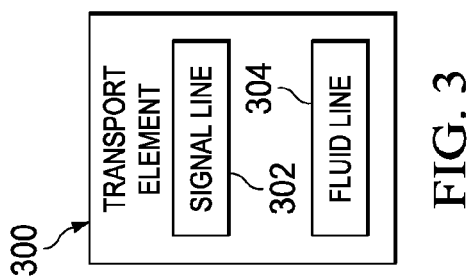
FIG. 3 is an illustration of a block diagram of a transport element in accordance with an illustrative embodiment.

Turning now to FIG. 3, an illustration of a block diagram of a transport element is depicted in accordance with an illustrative embodiment. In this illustrative example, transport element 300 is an example of a transport element that may be used in transport elements 112 in FIG. 1 and transport elements 202 in FIG. 2.

As depicted, transport element 300 may be selected from at least one of signal line 302, fluid line 304, and other suitable types of transport elements. In this illustrative example, signal line 302 is configured to carry signals in various forms. For example, signal line 302 may carry data, power, or some combination thereof. Signal line 302 may be selected from one of a wire, an optical fiber, a wireless link, or some other physical line configured to carry signals.

Signal line 302 may connect to electronics systems. For example, signal line 302 may be a network cable connected between two computers. A wireless link may be made between two electronic devices. The wireless link may carry data, power, or some combination thereof. The wireless link may be comprised of radio frequency waves, light, or some other form of electromagnetic radiation.

Fluid line 304 is configured to carry fluids. Fluid line 304 may carry fluids such as, for example, without limitation, a liquid, a gas, or some other type of fluid. Fluid line 304 may be, for example, a fuel line, a gas line, a hydraulics line, or some other suitable type of line.

Some types of transport elements 202 may cause interference with each other. For example, some electrical lines should be separated by some distance from other lines to avoid interference. The separation between lines may be made by routing the lines through pathways 132 through volume 128 for desired routing that provides the desired separation between the lines. For example, some electrical lines may have frequencies that can cause interference with other electrical lines. As a result, pathways 132 through volume 128 may be selected to maintain a desired separation between electrical lines to reduce a possibility of interference.

In other examples, a fluid in one fluid line may have a temperature that may interfere with a desired temperature with other fluids in other fluid lines if the fluid lines are closer to each other than some desired distance. Routing of fluid lines may be made through pathways 132 to avoid interference. Verifier 114 may verify that a desired separation is present between the lines, in these examples.

Figure 4:
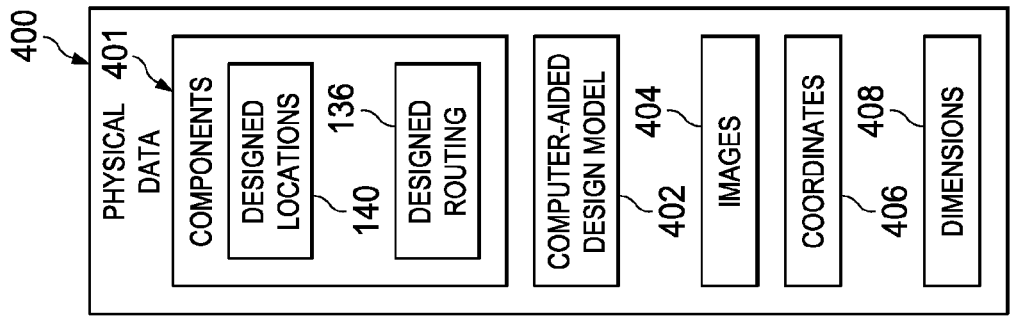
FIG. 4 is an illustration of a block diagram of physical data for an aircraft in accordance with an illustrative embodiment.

Turning now to FIG. 4, an illustration of a block diagram of physical data for an aircraft is depicted in accordance with an illustrative embodiment. In this illustrative example, physical data 400 includes components 401. Components 401 in physical data 400 identify systems 110 and transport elements 112 that are actually present in design 103 of aircraft 108. Physical data 400 also includes designed locations 140 of systems 110, designed routing 136 of transport elements 112 in FIG. 1, or some combination thereof in components 401.

The description of designed locations 140 and designed routing 136 for components 401 in physical data 400 may take a number of different forms. For example, physical data 400 may be at least one of computer-aided design model 402, images 404, coordinates 406, dimensions 408, and other suitable types of data.

Computer-aided design model 402 may be a model of components 401 as installed in aircraft 108. For example, computer-aided design model 402 may be generated from information about the installation of systems 110, transport elements 112, or both in components 401. Computer-aided design model 402 may be, for example, a wiring diagram.

In these illustrative examples, images 404 may be images of systems 110 and transport elements 112 within aircraft 108. Images 404 may be used to identify the locations of systems 110 and the locations and routing of transport elements 112.

Coordinates 406 are coordinates for components 401. For example, coordinates 406 may describe the location of transport elements 112 and the routing of those transport elements.

As depicted, dimensions 408 are dimensions for systems 110, transport elements 112, or both in components 401. For example, dimensions 408 may describe lengths, widths, bend angles, diameters, and other information.

The illustration of verification environment 100 in FIG. 1 and the components within verification environment 100 as depicted in FIGS. 1-4 are not meant to imply physical or architectural limitations to a manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples for an illustrative embodiment are described with respect to an aircraft, an illustrative embodiment may be applied to other types of platforms. The platform may be, for example, without limitation, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, a bus, an automobile, a power plant, a bridge, a dam, a manufacturing facility, a building, and other suitable platforms.

Figure 5:
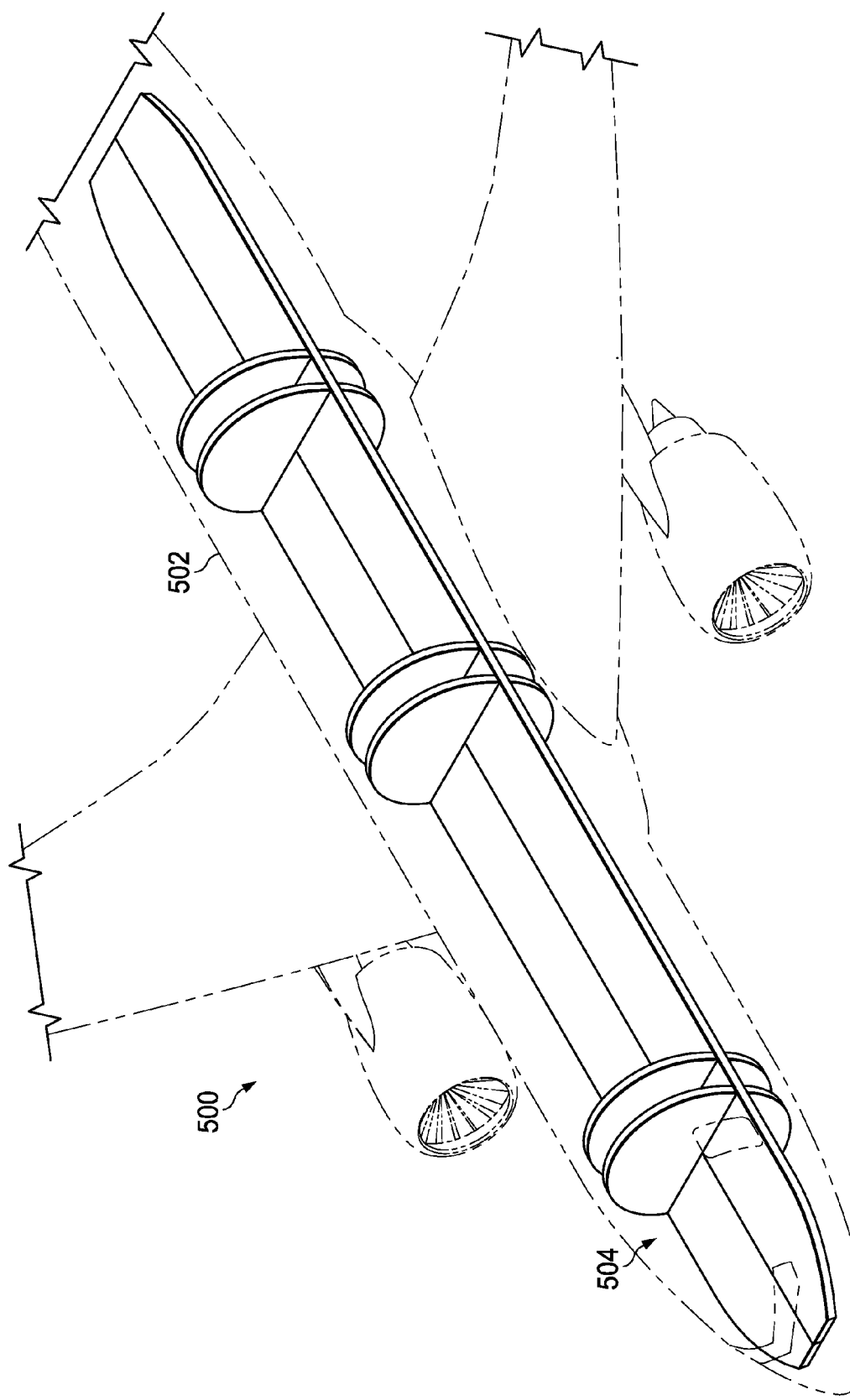
FIG. 5 is an illustration of volumes in an aircraft in a preferred systems layout in accordance with an illustrative embodiment.

Turning now to FIG. 5, an illustration of volumes in an aircraft in a preferred systems layout is depicted in accordance with an illustrative embodiment. In this illustrative example, display 500 is an example of a display that may be displayed on display system 118 by verifier 114 in FIG. 1.

In this illustrative example, display 500 includes aircraft 502 with volume 504 shown within aircraft 502. Volume 504 in aircraft 502 is an example of an implementation for volume 128 in FIG. 1. Volume 504 and aircraft 502 are examples of a display that may be generated from preferred systems layout 126 in FIG. 1. Volume 504 is an example of a volume in which systems 110 and transport elements 112 for aircraft 108 may be located. In some cases, aircraft 502 may be displayed from a design of aircraft 502 or from information in a preferred systems layout.

Figure 6:
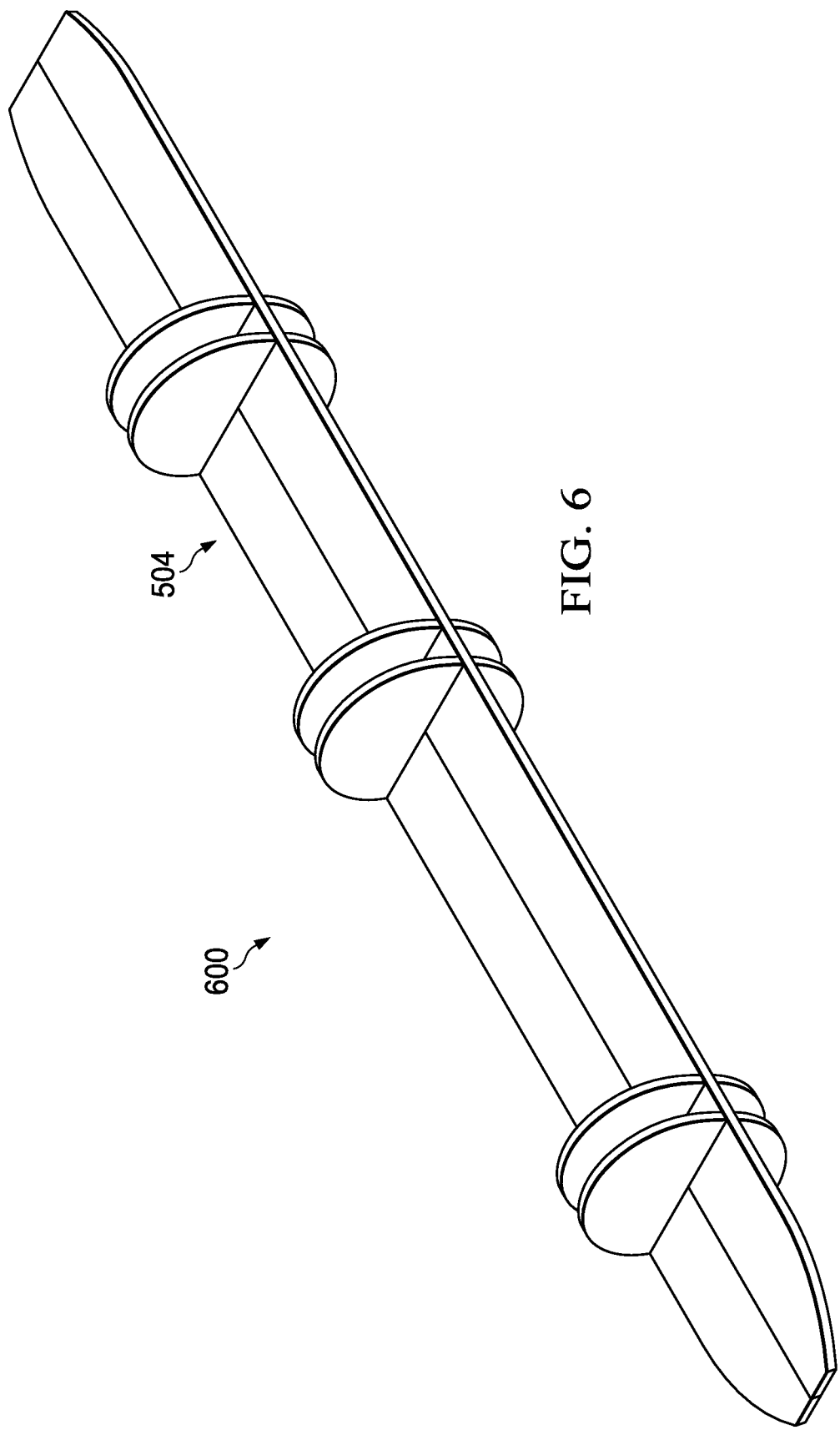
FIG. 6 is an illustration of a volume in accordance with an illustrative embodiment.

Turning now to FIG. 6, an illustration of a volume is depicted in accordance with an illustrative embodiment. In this depicted example, display 600 is an example of a display that may be displayed on display system 118 by verifier 114 in FIG. 1. As depicted in display 600, volume 504 is shown without aircraft 502. When verifier 114 performs a verification of a routing for a transport element within transport elements 112 to determine whether the designed routing of the transport element meets the desired routing, volume 504 may be filtered to identify a number of pathways through which the transport element may pass.

Figure 7:
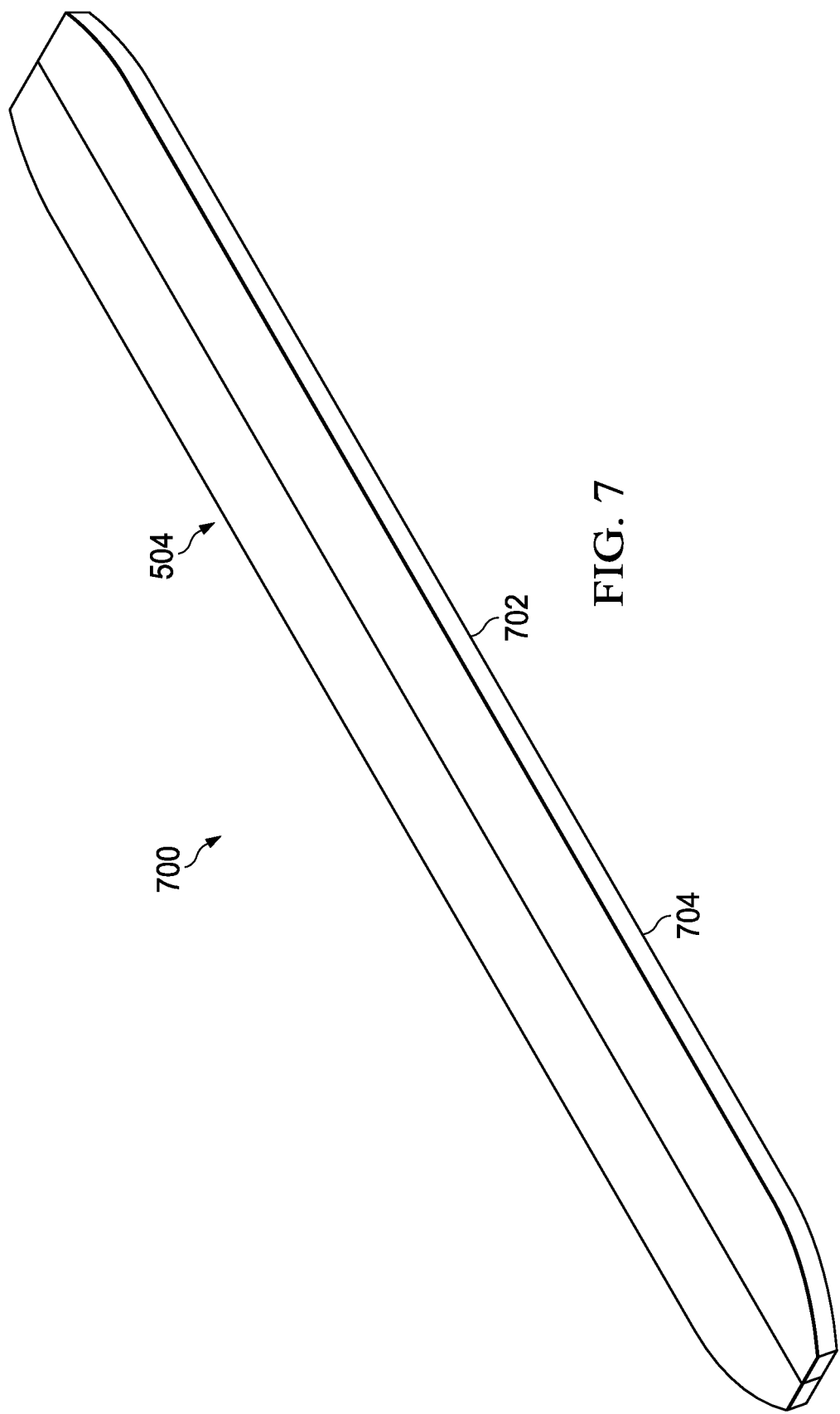
FIG. 7 is an illustration of a pathway in a volume in accordance with an illustrative embodiment.

In FIG. 7, an illustration of a pathway in a volume is depicted in accordance with an illustrative embodiment. Display 700 is an example of a display that may be displayed on display system 118 by verifier 114 in FIG. 1.

In this depicted example, pathway 702 is indicated within volume 504. Pathway 702 is a portion of volume 504 through which the transport element may pass. In other words, pathway 702 is a portion of volume 504 through which the transport element should be routed. Accordingly, the transport element should be located within pathway 702 through volume 504 to have a desired routing.

In this illustrative example, pathway 702 is graphically indicated by graphical indicator 704. Graphical indicator 704 may be color, cross-hatching, shading, animation, and other suitable types of graphical indicators.

Figure 8:
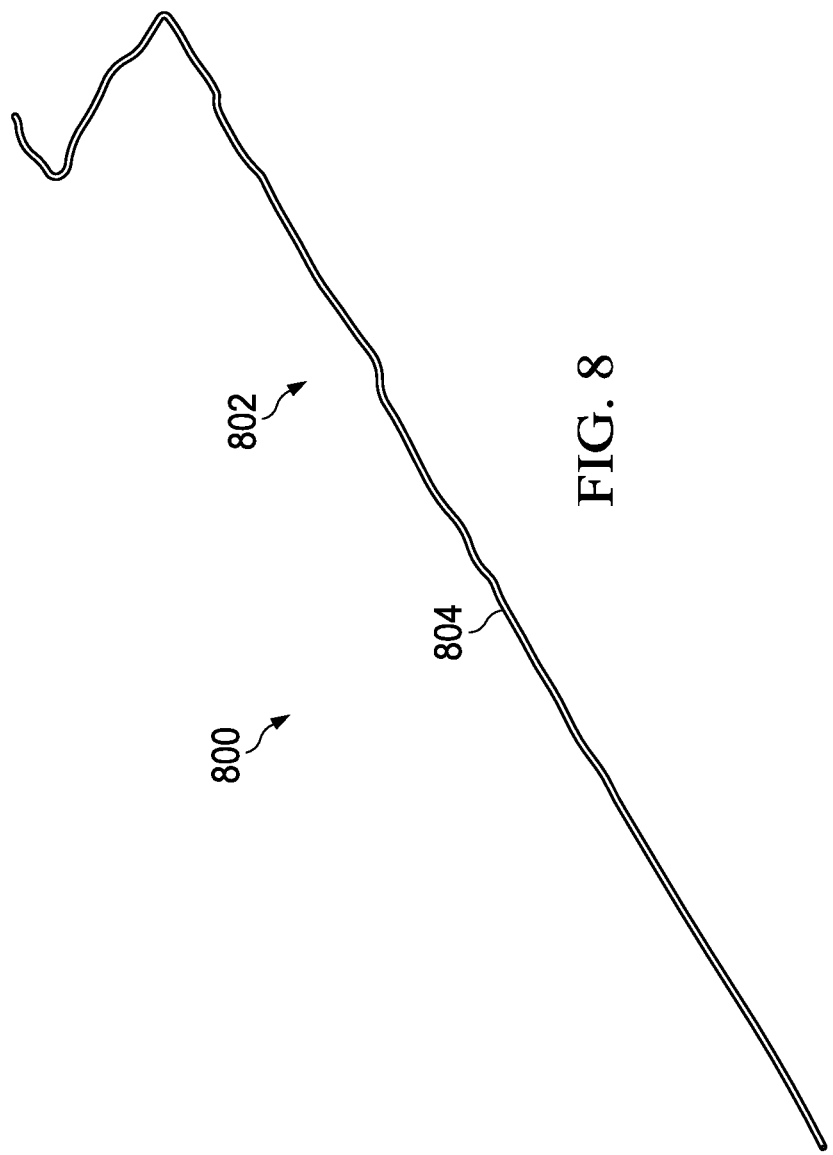
FIG. 8 is an illustration of a transport element in accordance with an illustrative embodiment.

Turing now to FIG. 8, an illustration of a transport element is depicted in accordance with an illustrative embodiment. Display 800 is an example of a display that may be displayed on display system 118 by verifier 114 in FIG. 1.

Transport element 802 is an example of a transport element within transport elements 112 on display system 118 in FIG. 1. In this depicted example, transport element 802 takes the form of wire 804. In display 800, the designed routing of wire 804 in an aircraft is shown in this illustrative example.

Figure 9:
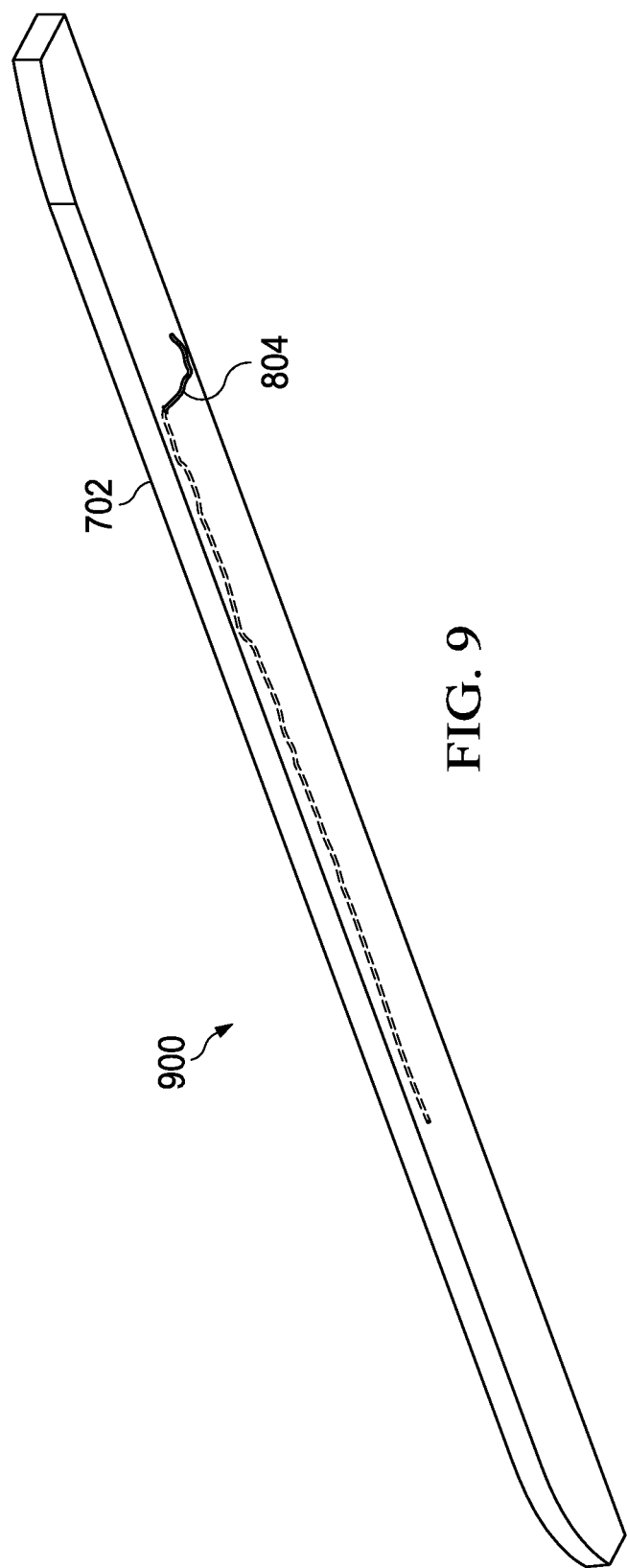
FIG. 9 is an illustration of a comparison of a pathway with a transport element in accordance with an illustrative embodiment.

Turning now to FIG. 9, an illustration of a comparison of a pathway with a transport element is depicted in accordance with an illustrative embodiment. Display 900 is an example of a display that may be displayed on display system 118 by verifier 114 in FIG. 1.

In this depicted example, pathway 702 and wire 804 are shown as being overlaid with each other. The model for pathway 702 and wire 804 may both be in the same coordinate system. For example, both pathway 702 and wire 804 may be described using an aircraft coordinate system for the aircraft. If different coordinate systems are used, a translation of one or both coordinate systems may be performed to overlay pathway 702 and wire 804 with each other.

Figure 10:
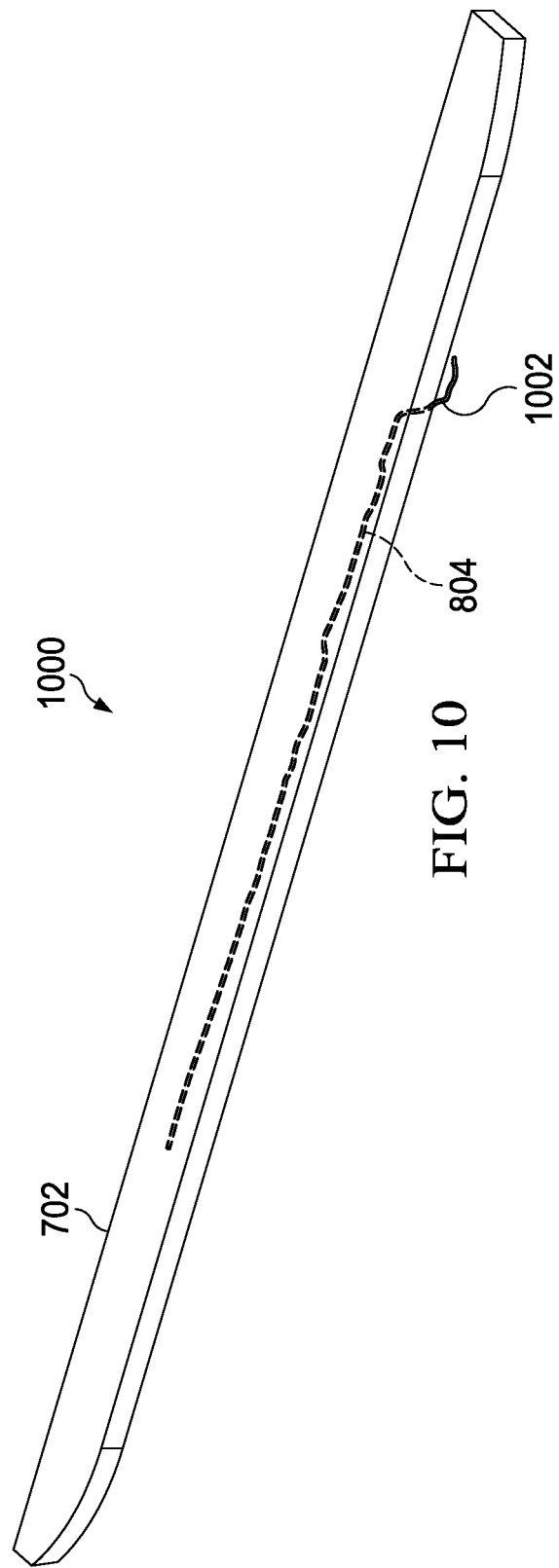
FIG. 10 is another view of a pathway and a wire in accordance with an illustrative embodiment.

Turning now to FIG. 10, another view of a pathway and a wire is depicted in accordance with an illustrative embodiment. Display 1000 is an example of a display that may be displayed on display system 118 by verifier 114 in FIG. 1.

In this illustrative example, portion 1002 of wire 804 is shown as extending outside of pathway 702. This deviation of portion 1002 of the wiring system from pathway 702 may be considered as not meeting the desired routing.

Of course, more analysis may be made at this point to determine whether portion 1002 of wire 804 outside of pathway 702 may still meet a desired routing for the wiring system to operate in a desired manner.

The illustrations of the different displays in FIGS. 5-10 are not meant to imply limitations to the manner in which information may be displayed by verifier 114 on display system 118 in FIG. 1. For example, two-dimensional displays may be presented instead of three-dimensional displays. The three-dimensional displays may show top and side views of the transport elements within the volumes.

In still other illustrative examples, verifier 114 may determine whether a transport element has a designed routing that meets the desired routing. In other words, verifier 114 may determine whether the transport element falls within a pathway through a volume. If the transport element does not entirely fall within the pathway through the volume, verifier 114 may then display the volume with the pathway and the transport element. In still other illustrative examples, the pathway with the transport element may be displayed within a volume.

Figure 11:
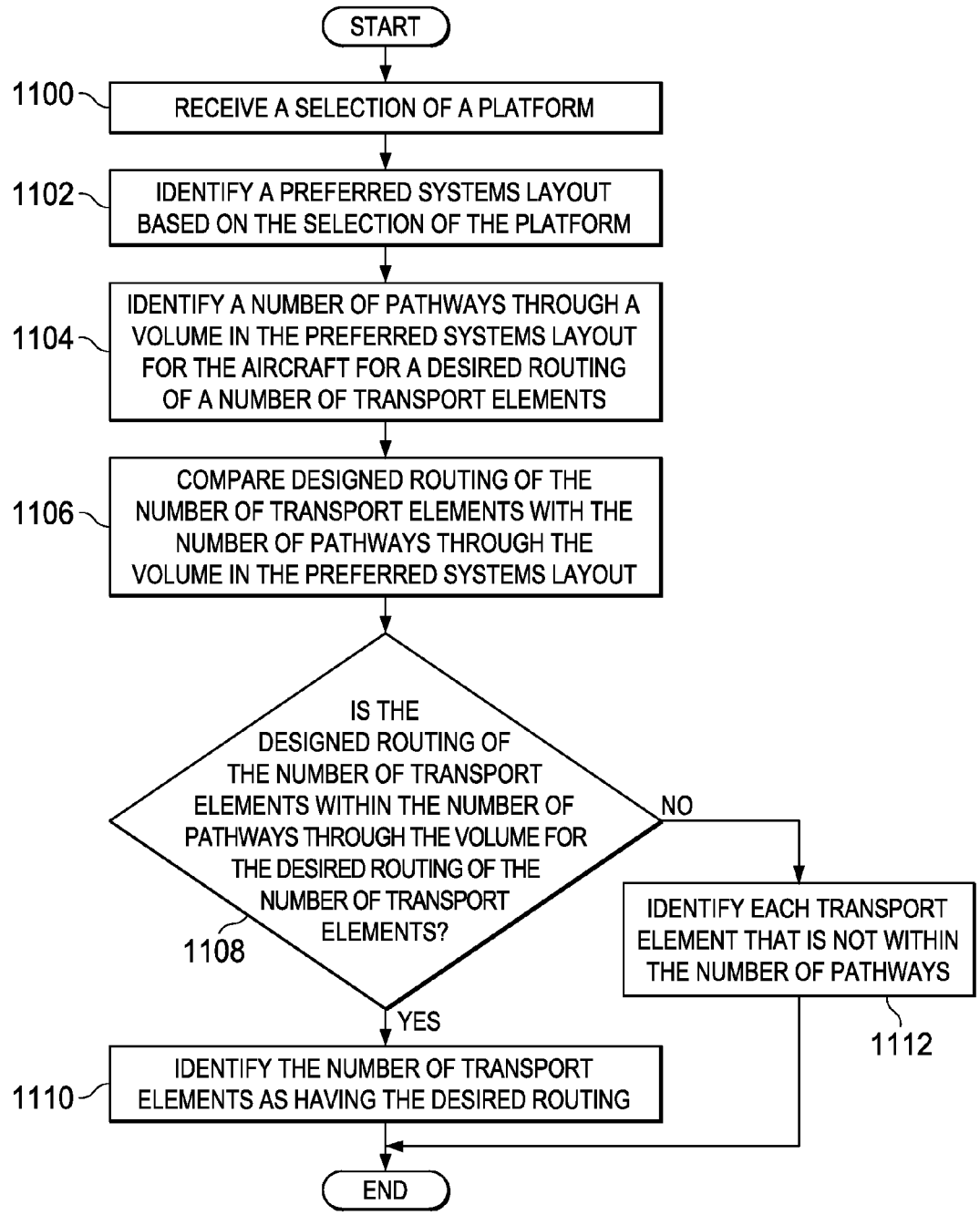
FIG. 11 is an illustration of a flowchart of a process for verifying routing of a number of transport elements in accordance with an illustrative embodiment.

Turning now to FIG. 11, an illustration of a flowchart of a process for verifying routing of a number of transport elements is depicted in accordance with an illustrative embodiment. In this illustrative example, FIG. 11 is an example of operations that may be performed using layout verification system 102 in FIG. 1. In particular, these operations may be performed by verifier 114 in FIG. 1.

The process begins by receiving a selection of a platform (operation 1100). In this illustrative example, the platform may be a vehicle such as an aircraft. The selection of the aircraft may include a model and in some cases may include a specific version of aircraft based on a customer request for different options. In these illustrative examples, the selection may be received by verifier 114 through user input system 120 in layout verification system 102.

The process then identifies a preferred systems layout based on the selection of the platform (operation 1102). In other words, the process finds the preferred systems layout that corresponds to the platform being verified. The preferred systems layout for the platform may be located in a library, a database, or some other collection of preferred systems layouts.

The process then identifies a number of pathways through a volume in the preferred systems layout for the aircraft for a desired routing of a number of transport elements (operation 1104). The process then compares designed routing of the number of transport elements with the number of pathways through the volume in the preferred systems layout (operation 1106). This comparison may be made in a number of different ways. For example, the designed routing of the number of transport elements may be overlaid onto the number of pathways through the volume.

Thereafter, a determination is made as to whether the designed routing of the number of transport elements is within the number of pathways through the volume for the desired routing of the number of transport elements (operation 1108). As described above, the designed routing may be the routing of the transport elements in the design of the platform, the routing to the transport elements as installed in the platform, or some combination thereof.

If the designed routing of the number of transport elements is within the number of pathways, the number of transport elements are identified as having the desired routing (operation 1110) with the process terminating thereafter. Otherwise, the process identifies each transport element that is not within the number of pathways (operation 1112) with the process terminating thereafter.

Figure 12:
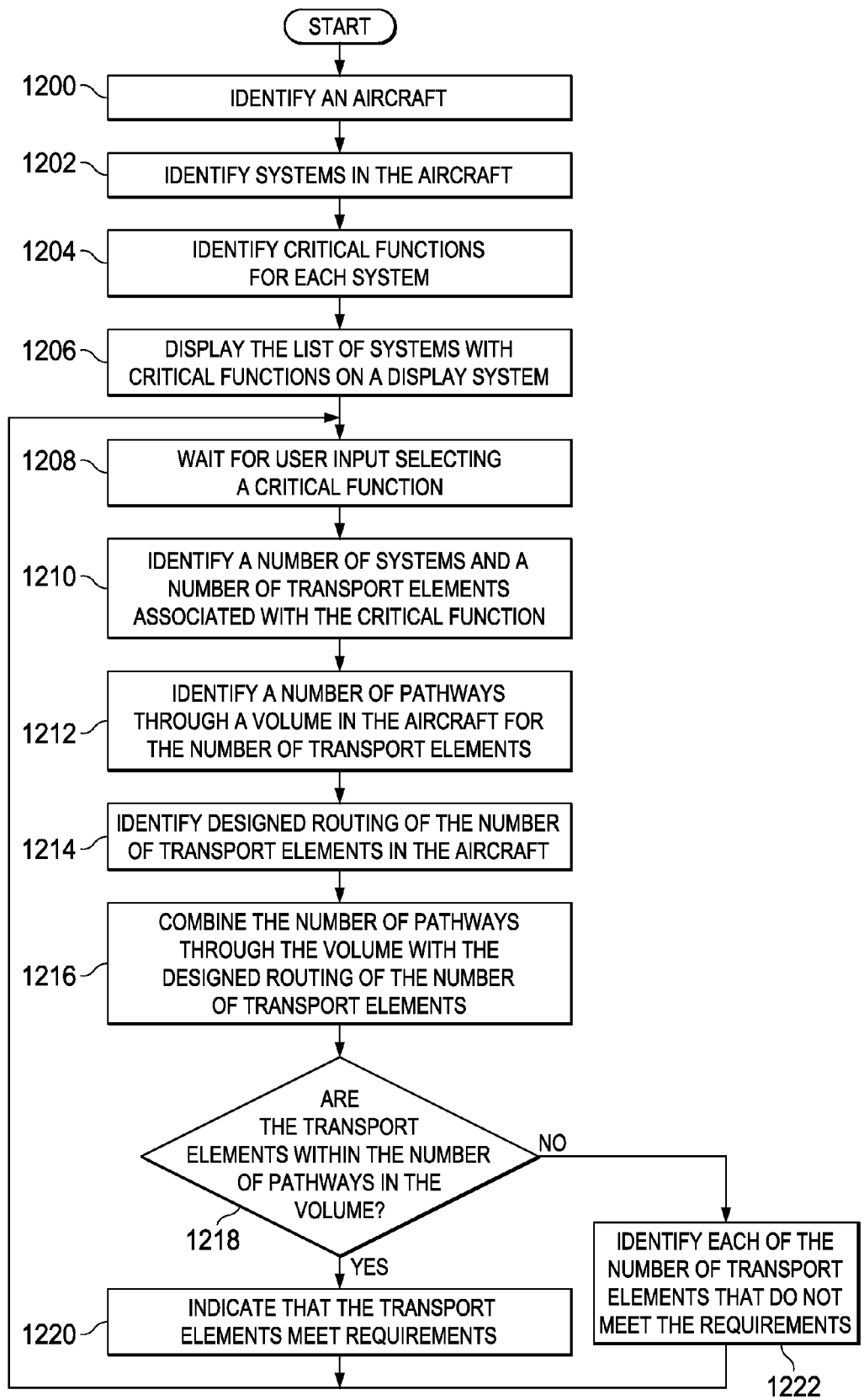
FIG. 12 is an illustration of a more detailed flowchart of a process for verifying transport elements in accordance with an illustrative example.

Turning now to FIG. 12, a more detailed flowchart of a process for verifying transport elements is depicted in accordance with an illustrative embodiment. The different operations in FIG. 12 may be implemented by verifier 114 in FIG. 1. The process illustrated in FIG. 12 may be implemented in verifier 114 such that the process may be driven through user input generated by an operator through user input system 120 and information may be displayed on display system 118 to the operator.

The process begins by identifying an aircraft (operation 1200). The aircraft may be identified through a user input in user input system 120 selecting the aircraft. This user input may be based on an entry of the model of the aircraft, a selection of the aircraft from a list, or in some other suitable type of user input.

The process then identifies systems in the aircraft (operation 1202). The systems are identified from physical data about the aircraft. This physical data may be, for example, physical data 400 in FIG. 4. This physical data may describe the aircraft as designed, as manufactured, or a combination of the two.

The process then identifies critical functions for each system (operation 1204). These critical functions are functions that are required by rules, such as rules 125 in FIG. 1. For example, these functions may be functions defined as needed for continued safe flight and landing of the aircraft. In these illustrative examples, some of the systems may not have critical functions depending on the particular aircraft. Systems that include critical functions may be identified from a preferred systems layout. Next, a list of systems with critical functions is displayed on a display system (operation 1206).

Thereafter, the process waits for user input selecting a critical function (operation 1208). In response to the user selecting a critical function, the process identifies a number of systems and a number of transport elements associated with the critical function (operation 1210). The process then identifies a number of pathways through a volume in the aircraft for the number of transport elements (operation 1212). In these illustrative examples, the number of pathways is identified using a preferred systems layout. The process also identifies designed routing of the number of transport elements in the aircraft (operation 1214). This information is identified from physical data about the routing of the transport elements. The physical data may be, for example, data for a wiring diagram.

The process then combines the number of pathways through the volume with the designed routing of the number of transport elements (operation 1216). A determination is made as to whether the transport elements are within the number of pathways in the volume (operation 1218).

If the number of transport elements are within the number of pathways, the process indicates that the transport elements meet requirements (operation 1220) with the process then returning to operation 1208. In these illustrative examples, the number of pathways may be a subset of all of the pathways in the volume. In some cases, the subset may only include a single pathway for a particular transport element.

Otherwise, the process identifies each of the number of transport elements that do not meet the requirements (operation 1222) with the process then returning to operation 1208. This process may continue as long as the operator desires to select systems for verification.

In performing the operations in FIG. 12, displays of one or more of the operations may be made on a display system. These displays may be similar to the displays depicted in FIGS. 5-10.

Figure 13A:
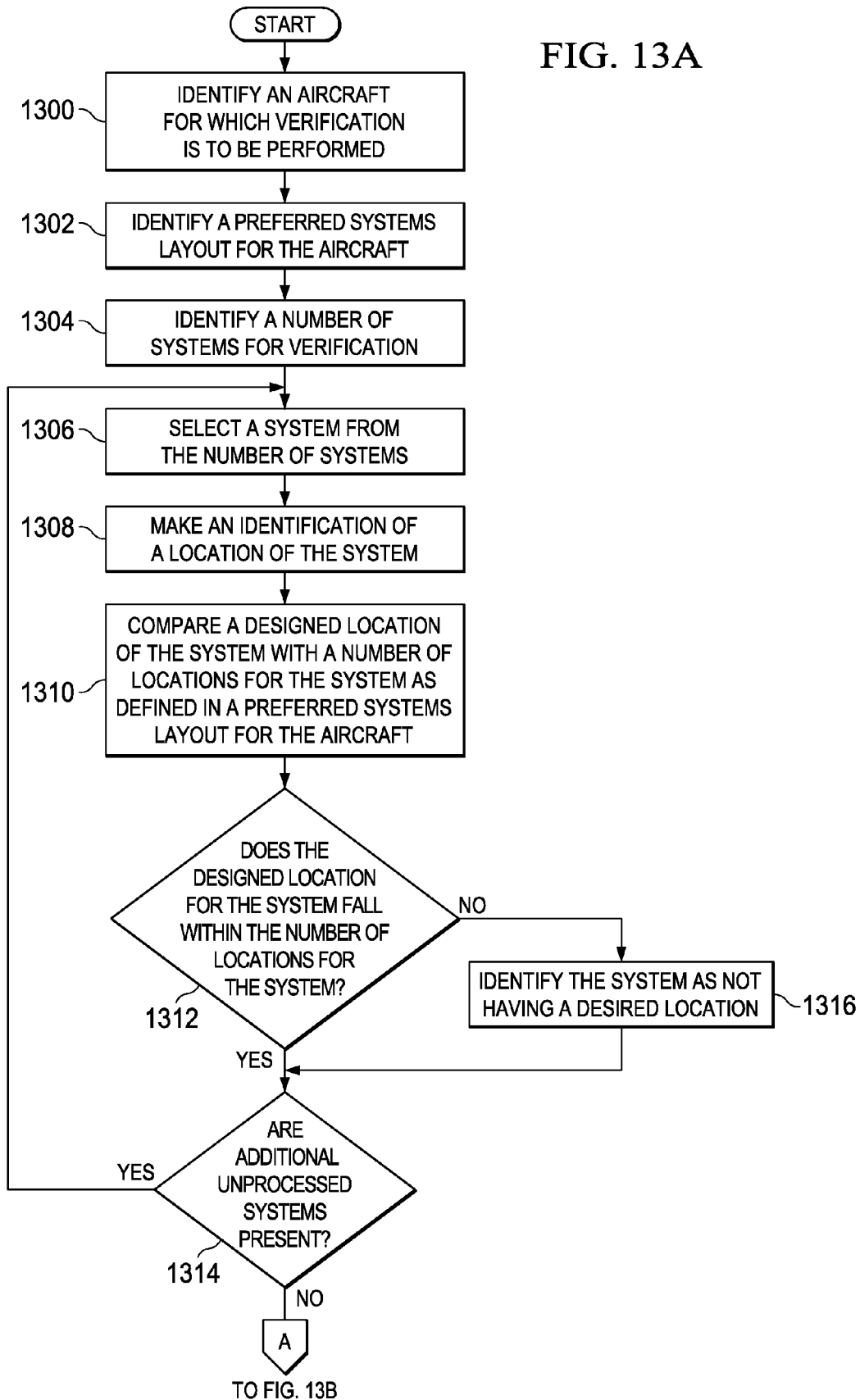
FIGS. 13A and 13B is an illustration of a more detailed flowchart of a process for verifying transport elements in accordance with an illustrative embodiment.
Figure 13B:
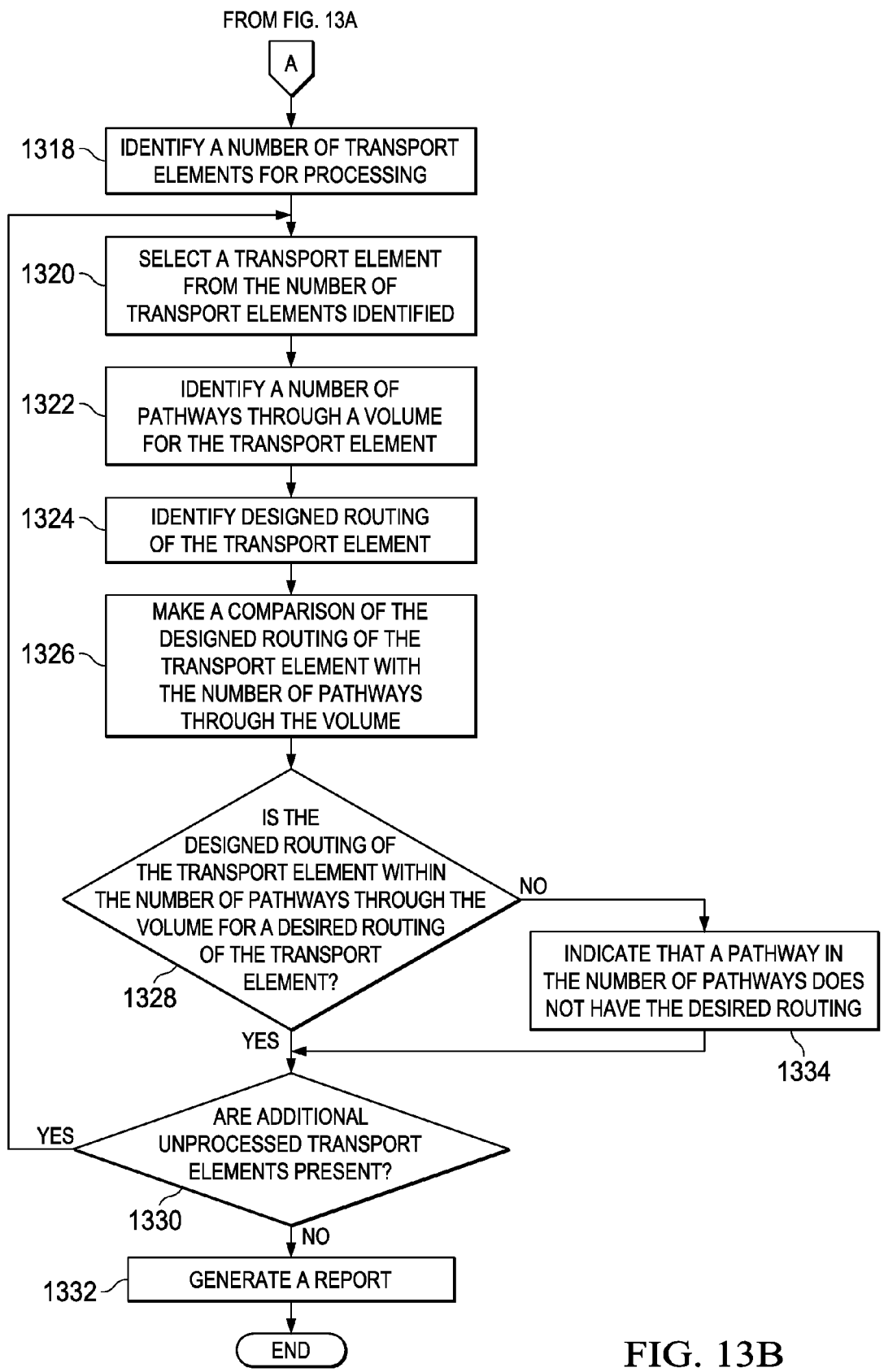

Turning now to FIGS. 13A and 13B, a more detailed flowchart of a process for verifying transport elements is depicted in accordance with an illustrative embodiment. The different operations in FIGS. 13A 13B may be implemented by verifier 114 in FIG. 1. In this particular example, the process may automatically perform a verification of the systems and transport elements.

The process begins by identifying an aircraft for which verification is to be performed (operation 1300). Thereafter, the process identifies a preferred systems layout for the aircraft (operation 1302). The process then identifies a number of systems for verification (operation 1304). This identification is made using physical data for the aircraft and the preferred systems layout. The physical data identifies systems present in the aircraft. The preferred systems layout is used to identify which of those systems in the aircraft should be verified.

The process then selects a system from the number of systems (operation 1306). Next, an identification of a location of the system is made (operation 1308). The location of the system may be identified from physical data such as physical data 400 in FIG. 4. This physical data may describe the planned location of the system in the aircraft.

The process then compares a designed location of the system with a number of locations for the system as defined in a preferred systems layout for the aircraft (operation 1310). A determination is then made as to whether the designed location of the system falls within the number of locations for the system (operation 1312). If the designed location of the system falls within the number of locations for the system, a determination is made as to whether additional unprocessed systems are present (operation 1314). If additional unprocessed systems are present, the process returns to operation 1306 to select another system for processing.

With reference again to operation 1312, if the designed location of the system does not fall within the number of locations for the system, the system is identified as not having a desired location (operation 1316) with the process then proceeding to operation 1314 as described above.

With reference again to operation 1314, if additional unprocessed systems are not present, the process then identifies a number of transport elements for processing (operation 1318). These transport elements may be identified in the preferred systems layout.

The process then selects a transport element from the number of transport elements identified (operation 1320). A number of pathways through a volume is identified for the transport element (operation 1322). The process also identifies designed routing of the transport element (operation 1324).

A comparison of the designed routing of the transport element is made with the number of pathways through the volume (operation 1326). A determination is then made as to whether the designed routing of the transport element is within the number of pathways through the volume for a desired routing of the transport element (operation 1328).

If the designed routing of the transport element falls within the number of pathways through the volume, the process then determines whether additional unprocessed transport elements are present for processing (operation 1330). If additional unprocessed transport elements are present, the process then returns to operation 1320 to select another transport element for processing.

Otherwise, the process generates a report (operation 1332) with the process terminating thereafter. This report may include an identification of any systems or transport elements found not to fall within the number of locations or the number of pathways. If all of the systems and transport elements fall within the number of locations and the number of pathways, the report may indicate that the aircraft meets the desired locations and the desired routing for meeting the rules for which the preferred systems layout was generated.

With reference again to operation 1328, if the transport element does not fall within the number of pathways through the volume, the process indicates that a pathway in the number of pathways does not have the desired routing (operation 1334) with the process then proceeding to operation 1330 as described above.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 14, an illustration of a data processing system is depicted in accordance with an illustrative embodiment. Data processing system 1400 may be used to implement computer system 116 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communication framework may take the form of a bus system.

Processor unit 1404 serves to execute instructions for software that may be loaded into memory 1406. Processor unit 1404 may be a number of processors, a multi-processor core, or some other type of processor, depending on the particular implementation.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these illustrative examples. In one example, computer readable media 1420 may be computer readable storage media 1424 or computer readable signal media 1426.

In these illustrative examples, computer readable storage media 1424 is a physical or tangible storage device used to store program code 1418 rather than a medium that propagates or transmits program code 1418.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1400 are not meant to provide architectural limitations to the manner in which different embodiments may be implemented. The different illustrative embodiments may be implemented in a data processing system including components in addition to and/or in place of those illustrated for data processing system 1400. Other components shown in FIG. 14 can be varied from the illustrative examples shown. The different embodiments may be implemented using any hardware device or system capable of running program code 1418.

Figure 15:
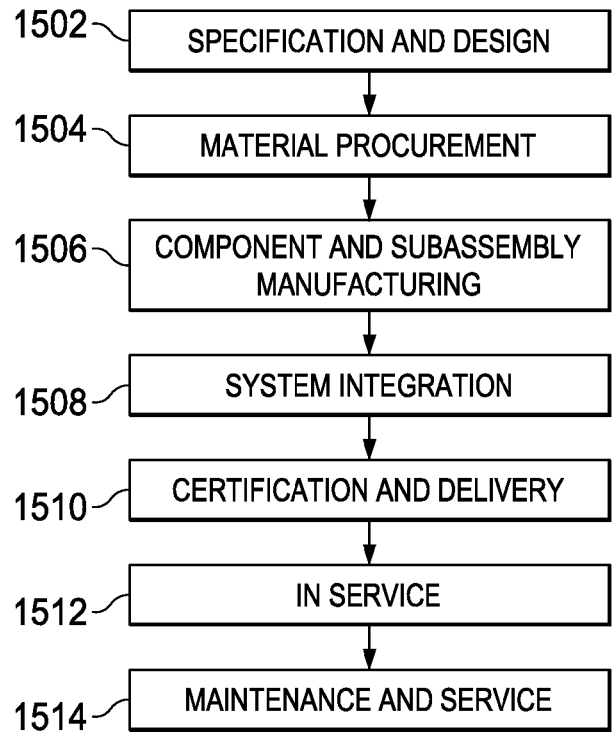
FIG. 15 is an illustration of an aircraft manufacturing and service method in accordance with an illustrative embodiment.
Figure 16:
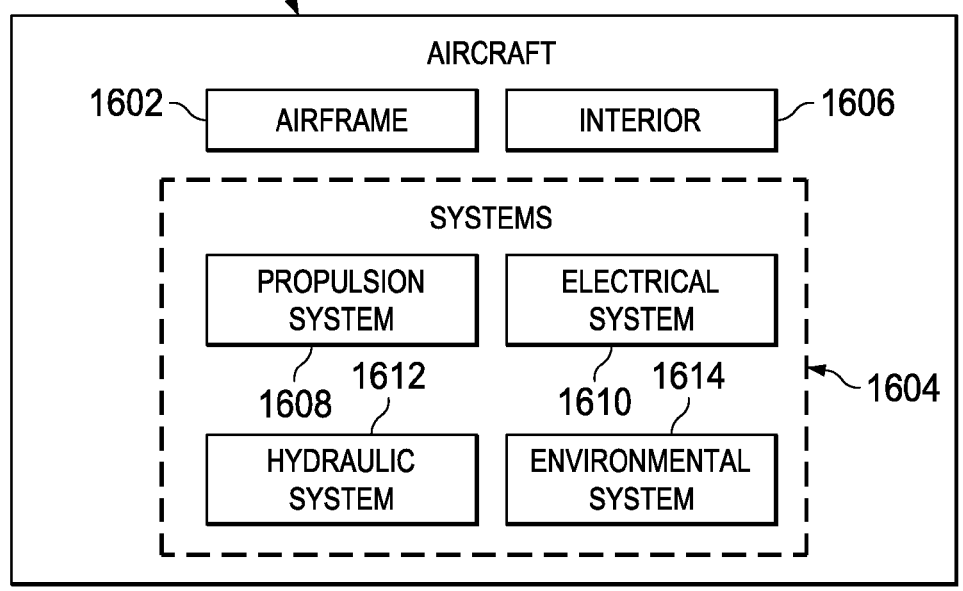
FIG. 16 is an illustration of an aircraft in which an illustrative embodiment may be implemented.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include one or more of propulsion system 1608, electrical system 1610, hydraulic system 1612, and environmental system 1614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15.

The illustrative embodiments may be implemented in different parts of aircraft manufacturing and service method 1500. For example, the illustrative embodiments may be used during specification and design 1502 of aircraft 1600 to generate a design that will meet rules pertaining to systems and transport elements in aircraft 1600. For example, the design of aircraft 1600 generated during specification and design 1502 may meet rules for continued safe flight and landing of aircraft 1600. In still other illustrative examples, an illustrative embodiment may be used during maintenance and service 1514. Verifications may be made as to whether designs for rework, upgrades, or other changes to systems and transport elements within aircraft 1600 meet rules pertaining to aircraft 1600 during maintenance and service 1514. The use of a number of the different illustrative embodiments may substantially expedite the assembly of and/or reduce the cost of aircraft 1600.

Thus, when using one or more illustrative embodiments, identifying desired routing of transport elements may be made more easily during design phases or other phases in which designs may be created, updated, and/or modified. By comparing the designed routing of the transport elements with desired routing in a preferred systems layout, a determination as to whether the designed routing of the transport elements meets rules pertaining to the aircraft may be made more easily using one or more of the illustrative embodiments described above.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for verifying routing of a number of signal lines in an aircraft, the method comprising:
   receiving a selection of a critical function required by a number of rules to provide continued safe flight and landing when certain undesired events occur;
   in response to the selection of the critical function, determining a number of systems and the number of signal lines associated with the critical function;
   after determining the number of systems and the number of signal lines associated with the critical function, identifying a number of pathways in the aircraft for the number of signal lines using a preferred systems layout;
   displaying, via a number of processors, the number of pathways as a volume in the aircraft for a desired routing of the number of signal lines, wherein the preferred systems layout for the aircraft defines the volume displayed in the aircraft;
   determining whether a designed routing of the number of signal lines in a design of the aircraft is within the number of pathways through the volume for the desired routing of the number of signal lines; and identifying the number of signal lines associated with the critical function as having the desired routing in the design in response to a determination that the designed routing is within the number of pathways through the volume;

wherein the volume is one in which equipment and the signal lines are placed such that the signal lines include a level of redundancy and such that the signal lines for the equipment pass through different ones of the number of pathways.

2. The method of claim 1 further comprising:
receiving a selection of the number of signal lines.

3. The method of claim 2, wherein receiving the selection of the number of signal lines comprises:
displaying systems in the aircraft with functions on a display system; and
responsive to a selection of a function from the functions displayed on the display system, identifying the number of pathways through the volume and the designed routing of the number of signal lines associated with the function selected.

4. The method of claim 1, wherein the preferred systems layout is located in a database of preferred systems layouts.

5. The method of claim 1, wherein the number of pathways through the volume in the aircraft for the desired routing of the number of signal lines is based on a set of regulations.

6. The method of claim 5, wherein the set of regulations is selected from at least one of manufacturer regulations and government regulations.

7. The method of claim 1, wherein a signal line in the number of signal lines is selected from one of a wire, an optical fiber, and a wireless communications link.

8. The method of claim 1, wherein the volume and the number of pathways form the preferred systems layout for the number of signal lines.

9. The method of claim 1, further comprising:
identifying the preferred systems layout based on a selection of a platform; and
wherein the identifying of the number of pathways is based on the selection of the critical function; and
wherein the preferred systems layout is based on the number of rules.

10. The method of claim 1, further comprising:
identifying each of the signal lines that are not within the number of pathways of the volume;
wherein the pathways are each a portion of the volume through which the signal lines should be routed.

11. A method for verifying routing of a number of transport elements, the method comprising:
receiving a selection of a critical function required by a number of rules to provide continued safe flight and landing when certain undesired events occur;
in response to the selection of the critical function, determining a number of systems and a number of transport elements associated with the critical function;
after determining the number of systems and the number of transport elements associated with the critical function, identifying a number of pathways in a vehicle for the number of transport elements using a preferred systems layout;
displaying, via a number of processors, the number of pathways as a volume in a vehicle for a desired routing of the number of transport elements, wherein a preferred systems layout for the vehicle defines the volume displayed in the vehicle;

determining whether a designed routing of the number of transport elements in a design of the vehicle is within the number of pathways through the volume for the desired routing of the number of transport elements; and identifying the number of transport elements associated with the critical function as having the desired routing in the design in response to a determination that the designed routing is within the number of pathways through the volume;

wherein the volume is one in which equipment and the transport elements are placed such that the transport elements include a level of redundancy and such that the transport elements for the equipment pass through different ones of the number of pathways.

12. The method of claim 11, wherein a transport element in the number of transport elements is selected from at least one of a wire, a fluid line, a gas line, a fuel line, a hydraulic fluid line, an optical fiber, and a wireless communications link.

13. The method of claim 11, wherein the volume and the number of pathways are defined in the preferred systems layout for the number of transport elements.

14. The method of claim 11, wherein the vehicle is selected from one of an aircraft and a spacecraft.

15. An apparatus comprising:
a number of processors;
a display configured to
display, via the number of processors, a number of pathways as a volume in an aircraft for a desired routing of a number of signal lines, wherein a preferred systems layout for the aircraft defines the volume displayed in the aircraft; and
a verifier configured to:
receive a selection of a critical function required by a number of rules to provide continued safe flight and landing when certain undesired events occur;
in response to the selection of the critical function, determine a number of systems and the number of signal lines associated with the critical function;
after determining the number of systems and the number of signal lines associated with the critical function, identify the number of pathways in the aircraft for the number of signal lines using a preferred systems layout;
determine whether a designed routing of the number of signal lines in a design of the aircraft is within the number of pathways through the volume for the desired routing of the number of signal lines; and
identify the number of signal lines associated with the critical function as having the desired routing in the design in response to a determination that the designed routing is within the number of pathways through the volume;
wherein the volume is one in which equipment and the signal lines are placed such that the signal lines include a level of redundancy and such that the signal lines for the equipment pass through different ones of the number of pathways.

16. The apparatus of claim 15, wherein the verifier is further configured to receive a selection of the number of signal lines.

17. The apparatus of claim 16, wherein in being configured to receive the selection of the number of signal lines, the verifier is configured to display systems in the aircraft with functions on a display system and responsive to a selection of a function from the functions displayed on the display system, identify the number of pathways through the volume and the designed routing of the number of signal lines associated with the function selected.

18. The apparatus of claim 15, wherein the preferred systems layout is located in a database of preferred systems layouts.

19. The apparatus of claim 15, wherein the number of pathways through the volume in the aircraft for the desired routing of the number of signal lines is based on a set of regulations.

20. The apparatus of claim 15, wherein the volume and the number of pathways are defined in the preferred systems layout for the number of signal lines.

21. A method comprising:
identifying an aircraft based on an entry of a model of the aircraft and a selection of the aircraft from a list;
identifying systems in the aircraft from physical data about the aircraft that describe the aircraft as designed and as manufactured;
identifying critical functions for each system that are required by rules, the critical functions defined as needed for continued safe flight and landing of the aircraft
wherein the systems that include critical functions are identified from a preferred systems layout;
after identifying the critical functions, displaying a list of systems with critical functions on a display system;
wherein the rules define requirements for desired operation of aircraft, do not define placement of the systems and routing of transport elements in the aircraft, define what is required from systems and transport elements to provide desired operation of the aircraft in response to an undesired event, and define requirements for the systems and transport elements for other types of desired operation that are not in response to an undesired event;
wherein the rules include government regulations, client performance specifications, and manufacturing rules based on customer preferences;
wherein the government regulations are from a government entity and define rules for a manner in which the systems and the transport elements form to meet a desired level of operation such as continued safe flight and landing when certain undesired events occur;
wherein the customer preferences include a level of redundancy in transport elements so as to have transport elements for a same system pass through different pathways through different volumes in the aircraft;
after displaying the list of systems with critical functions, receiving a selection of a critical function;
in response to the selection of the critical function, identifying a number of systems and a number of transport elements associated with the critical function;
after identifying the number of systems and the number of transport elements associated with the critical function, identifying a number of pathways through a volume in the aircraft for the number of transport elements using a preferred systems layout, and
identifying a designed routing of the number of transport elements in the aircraft from physical data about routing of the transport elements;
wherein the physical data includes a wiring diagram;
wherein the number of pathways are a subset of all pathways in the volume;
determining whether the transport elements are within the number of pathways in the volume;
if the number of transport elements are within the number of pathways, indicating that the transport elements meet the requirements; and
if the number of transport elements are not within the number of pathways, identifying each of the number of transport elements that do not meet the requirements.

\* \* \* \* \*